United States Patent [19]

Nemesi et al.

[11] Patent Number: 4,660,779

[45] Date of Patent: Apr. 28, 1987

[54] MULTILAYER PRECISION WOUND FILTER CARTRIDGE

[75] Inventors: Stephen A. Nemesi, Carmel; James R. Schmitz, Indianapolis, both of Ind.

[73] Assignee: Dorr-Oliver Incorporated, Stamford, Conn.

[21] Appl. No.: 855,021

[22] Filed: Apr. 22, 1986

Related U.S. Application Data

[63] Continuation-in-part of Ser. No. 599,041, Apr. 11, 1984, abandoned.

[51] Int. Cl.⁴ .................. B01D 29/48; B65H 81/00
[52] U.S. Cl. ........................ 242/7.02; 55/487; 55/520; 210/491; 210/492; 210/494.1; 210/497.1
[58] Field of Search ............... 55/457, 487, 489, 520; 210/489, 491, 492, 494.1, 497.1, 505, 767; 242/7.01, 7.02, 7.21

[56] References Cited

U.S. PATENT DOCUMENTS 3,334,752 8/1967 Matravers .................. 210/497.1 X
3,648,846 3/1972 Sicard ......................... 210/494.1

*Primary Examiner*—Richard V. Fisher
*Assistant Examiner*—W. Gary Jones
*Attorney, Agent, or Firm*—Burtsell J. Kearns; Gary R. Plotecher; Larry W. Evans

[57] ABSTRACT

A method for making a precision wound tubular shaped filter cartridge wherein a filter medium comprising a roving is wound about a central foraminous core to provide a base inner and an outer helical winds of roving each provided with pluralities of both axial and circumferential flow passages wherein the circumferential flow passages of the inner and outer wind are radially aligned at the interface of the winds to provide unrestricted flow paths between the inner and outer wind.

8 Claims, 2 Drawing Figures

MULTILAYER PRECISION WOUND FILTER CARTRIDGE

This application is a continuation-in-part of U.S. Ser. No. 599,041 filed Apr. 11, 1984, now abandoned.

BACKGROUND OF THE INVENTION

The present invention is directed to new and useful improvements in filter cartridges and in particular to methods for making precision wound tubular shaped filter cartridges comprises of helically wound multiple layers of yarn or roving.

It is well known to provide filter cartridges for purifying liquid input streams wherein the cartridge comprises a tubular element having a foraminous core about which layers of spaced convolutions of fibrous filter yarn are precision wound. The yarn is applied in crisscross fashion to form a plurality of diamond shaped filtering passageways from the outer surface of the element to the foraminous cores. As fluid passes through the filter element through the diamond shaped passageways dirt particles or the like in the fluid are captured among the fibrous yarn strands which may be napped to provide additional dirt capturing fibers.

In general, precision wound filters are formed by mounting the foraminous core in a horizontal position on a motor driven spindle. One end of the strand of filtering material is tied or otherwise fixed to one end of the sidewall of the core. The strand passes through a guide which is aranged through a gear train or similar arrangement to maintain a precise relationship between rotations of the core and traverse of the guide, to move back and forth along the length of the core, as the core is rotated. As the guide travels in one direction along the rotating core, a spiral or strand is wrapped around the core from one end to the other. When the guide reaches the far end of the core, it reverses in direction and travels back to the beginning point. During this travel in a reverse direction, the core continues to rotate in the same direction. In this manner a reverse spiral of strand is laid down on the core overlaying the original strand spiral, forming a diamond pattern which provide passageways for the fluid to be filtered.

Typical filter cartridges have a foraminous core with a diameter of about 1⅛ inches and an overall diameter of about 2 7/16 inches with a filter medium (i.e. the buildup of fibrous strands on the core) being about 11/16 inches thick. The standard length of the filter cartridge is 10 inches for insertion in a suitable file housing. The ratio of circumferential diamond shaped passages to axial diamond shaped passages is usually within the range of about 2 to about 5 whereby for each circumferential diamond there are about 2 to 5 axial diamonds.

Since these filter cartridges are disposable and replaceable once they reach their rated dirt holding capacity there have been many prior art efforts to increase the useful life and dirt holding capacity of these cartridges within the previously mentioned required dimensional restrictions.

In one known type precision wound filter cartridge of the type described it is known to provide a filter medium comprised of layers of different densities (wind geometries) wherein the inner layer or base wind is provided with a greater number of circumferential diamonds than the outer layer or wind to improve the efficiency of the cartridge over mono-layer wound cartridges.

Although these known multi-layer filter cartridges are meant to maintain efficiency and maximize filter characteristics of the cartridge problems are encountered in preventing the plugging of the radial helically disposed flow passageways due to restrictions in the flow patterns of the diamond shaped passageways occurring at the interface between adjacent layers. The communication of passageways and the interlayer restrictions between layers resulted in the loss of efficiency and shortening of the useful life span of the filter cartridge. It was found that in the positioning of layers the roving strands in the more open outer layer restricted access of fluid to the channels in the tighter inner layer adjacent the core. These flow restrictions were found to cause a higher pressure drop and thus a decrease in dirt holding capacity and a plugging of the radial passageway.

It is an object of the present invention to provide a novel multiple layer precision wound filter.

Another object is to provide a novel multilayer filter cartridge having increased dirt holding capacity.

A still further object is to provide a multiple layer filter cartridge wherein flow restrictions between adjacent layers is greatly reduced through novel positioning of the radial flow passages between adjacent layers.

SUMMARY OF THE INVENTION

The present invention contemplates a novel precision yarn wound tubular shaped filter cartridge of multiple wind or layer construction wherein at least the inner layer or base wind is more tightly wound than the outer layer or wind resulting in a greater number of axial and circumferential diamond shaped flow passages in the inner layer which is wound about a foraminous inner core discharge tube. The present invention contemplates the proper prealignment of flow passages between the flow channels of the inner and outer layer at the interface thereof to avoid flow restrictions and increase dirt holding capacity of the filter cartridge.

The above and other objects and advantages of the present invention will appear more fully hereinafter from a consideration of the detailed description which follows taken together with the accompanying drawings wherein an embodiment of the invention is clearly illustrated.

DETAILED DESCRIPTION

Figure 1:
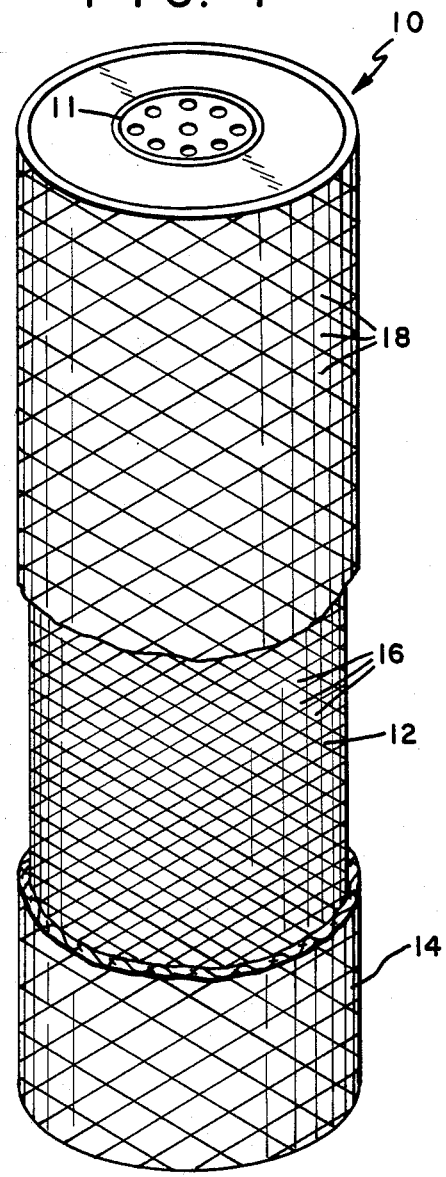
FIG. 1 is a generally schematic perspective view of a multilayer filter cartridge with portions of the outer layer cut away to expose the inner layer.

Referring now to the drawings for a more detailed description of the present invention a filter cartridge made in accordance with the present invention is generally indicated by the reference numeral 10 in FIG. 1. Cartridge 10 has a cylindrical inner foraminous core 11 and although ordinarily formed preferably of a perforated tinned steel, other materials such as stainless steel or plastic may be used.

Cartridge 10 includes a precision wound base wind or inner layer of yarn identified by the reference numeral 12 and an outer wind or layer or yarn identified by the reference numeral 14. In the precision winding of layers 12 and 14 as the fibrous yarn or woven is laid in criss-cross pattern by a winder machine a greater number of helical flow passages 16 are provided in base wind 12 than the helical diamond shaped flow passages 18 in outer wind 14. In the embodiment of the present invention shown in FIG. 2 the ratio of circumferential or radial diamonds 16 in the base wind 12 to the circumferential or radial diamonds 18 in outer wind 14 is a ratio of 19 to 11 with the diamond shaped passages 18 of the outer wind 14 of a greater size than the diamonds of the base wind 12.

Figure 2:
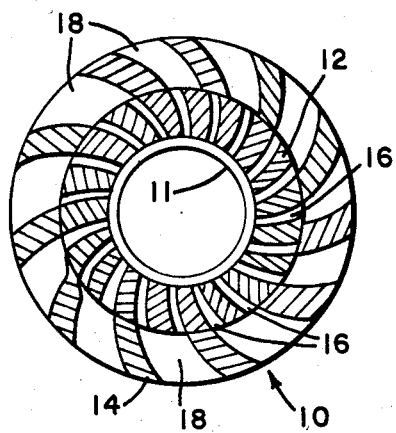
FIG. 2 is a transverse cross-sectional view of a filter cartridge in accordance with the present invention.

Although not shown in a filter cartridge 10 of a standard ten inch length, it is well known that the ratio number of axial or longitudinally situated diamond shaped passages to circumferential diamond shaped passages are about 2 to 5 axial diamonds. The number of diamonds and layer ratio of diamonds between the base wind and outer wind of a cartridge being selected in accordance with the micron rating for the cartridge for the selected fluid to be filtered. The micron rating is defined as the point at which 90% of a specific size of dirt particle is removed from the fluid passing through the filter. In the cartridge of FIG. 2 assuming the micron rating is 10 the ratio of radial to axial diamonds in the outer wind 12 is 11 to 36 and in the base wind 14 the ratio is 19 to 66. A suggested chart is as follows:

| MICRON RATING | BASE WIND RADIAL | BASE WIND AXIAL | OUTER WIND RADIAL | OUTER WIND AXIAL |
| --- | --- | --- | --- | --- |
| 1 | 31 | 108 | 13 | 42 |
| 2 | 39 | 131 | 13 | 42 |
| 3 | 25 | 87 | 12 | 39.5 |
| 3 | 25 | 87 | 21 | 39.5 |
| 5 | 23 | 80 | 12 | 39.5 |
| 10 | 19 | 66 | 11 | 36 |
| 20 | 19 | 66 | 9 | 31 |
| 30 | 17 | 58 | 7 | 23.5 |

A further example from the above chart to show that it is not required that the number of radial and axial passages in a wind need not decrease with an increase in the micron rating is demonstrated at the 2 micron rating cartridge when more base wind radial diamonds (39) than for a 1 micron rating cartridge (31) is shown. It is known to those skilled in the art that for the 31-108 ratio wind the roving strands actually lie in a more compact geometry than for the 39-131 ratio wind so that the 31-108 ratio wind is more desirable in removing fine particles than the 39-131 ratio wind. It has also been found that it may be advantageous to adjust the ratio of radial diamonds in the base wind to the outer wind depending on the size distribution of particles in the fluid to be filtered. For example, for achieving 3 micron rating filtration in the case where the size distribution ranges from about 0 to 100 microns, the above 25 base wind and 12 outer wind is effective in providing increased dirt holding capacity over conventional single wind pattern cartridges. But for achieving 3 micron rating filtration where the size distribution ranges from about 0 to only about 10 microns, improved dirt holding capacity is achieved by using a cartridge with a 25 base wind and a 21 outer wind. By increasing the number of radial diamonds in the outer wind, more removal of the fine particles is accomplished in the outer wind before the inner wind becomes plugged.

The structure thus far described represents known structure for filter cartridges of the type for example as disclosed in abandoned application Ser. No. 447,177 filed Dec. 6, 1982 entitled "Multiple Layer Precision Wound Filter". It is also known that a filter cartridge will fail and require replacement when the cartridge is clogged and the pressure drop across the filter becomes excessive. In these cartridges the dirt is entrapped in the filter strands within the flow passageways and in known multiple layer type cartridge although the outer layer is effective to entrap a significant number of dirt particles a clogging of the passage occurs at the transition or interface of flow passage from the outer wind to the base wind.

It was found that by prealigning the exit flow of the circumferential flow passages 18 of outer wind 14 with the entry openings of passages 16 of base wind 12 rather than permit random positioning of the interface between the base and outer winds achieved maximum dirt holding capacity for the filter cartridge can be achieved. In forming a cartridge the roving or yarn is applied to a rotating core while traversing it along the length thereof with a cam or guide. The wind pattern is developed by holding the ratio speeds of the rotating core and transversing cam constant and the wind patterns are changed by changing the latter ratio. Typically winders hold these ratios constant by using a specified number and combination of gears in a known manner to connect the core and the cam or by electronically controlling the speeds of motors driving the core and cam. If a multiple layer cartridge is wound differential gear boxes or electronic switching mechanisms are used to change the ratio at completion of the base wind.

In known multilayer cartridge forming processes, the diamond pattern is changed from that of the base wind to that of the outer wind as the winder traverses the length of the cartridge in an area referred to as a coasting area. In this coasting area, the ratio of the core to traverse speeds is momentarily uncontrolled and the winder is free to coast. It was found that as a result of the change over in diamond patterns in the coasting area, the random alignment of flow passages between base and outer winds was effected.

It is also known that in such processes that there is a transition zone at each end of the cartridge where the reversal of the roving takes place, for example, extending ¼ to ½ inches in length at the end of the cartridge. It was found that if the ratio change was effected in the transition zone that the proper alignment of helical flow passages can be controlled. Since for any given winder device both the length of the transition zone and the time to make the ratio change are constant the proper position for ratio change is accomplished by matching the winder traversing speed to the transition zone length and causing the change to begin as the roving enters the transition zone with proximity switches at the end of the cartridge activated for changing the mechanism at the appropriate predetermined time.

It will be apparent from the foregoing description that the novel filter cartridge and means for aligning flow passages has many advantages in use. One advantage is that the flow pattern from outer wind to base wind to the foraminous core is unrestricted and permits increased dirt holding capacity for a filter cartridge.

Although one embodiment of the present invention has been illustrated and described in detail it is to be expressly understood that the invention is not limited thereto. Various changes can be made in the design and arrangement of parts without departing from the spirit and scope of the invention as the same will now be understood by those skilled in the art.

What is claimed is:

1. A method of making a precision helically wound filter cartridge of yarn or roving having a micron rating in the range of 1 to 30 comprising
   (a) helically winding by a precision winder a base wind of diamond shaped passages of filter yarn material onto a rotating cylindrically shaped foraminous core in a crisscross path using a wind number in the range of about 17 to about 39;
   (b) helically winding by the precision winder a second wind of diamond shaped passage of filter yarn material over said base wind in a crisscross path having a different wind number than said base wind number selected in the range of 7 to 21 to form an outer wind wherein the diamond shaped flow passages in said outer wind are lesser in number than said base wind;
   (c) switching the ratio of the core rotation speed to the winder speed in a coasting zone at one end of the core prior to commencing the laying of said outer wind and prior to completion of said base wind, and
   (d) reversing the direction of the yarn in a predetermined transition zone at said core end to align said flow passages at the interface of said winds one with the other to provide unrestricted flow paths between said base and outer winds.

2. The method of claim 1 wherein the winder is switched in a transition zone of $\frac{1}{4}$ to $\frac{1}{2}$ inches in length at the end of said filter cartridge.

3. The method of claim 2 wherein said wind number of said base wind to said outer wind is a ratio of about 31 to 7.

4. The method of claim 2 wherein the micron rating of the cartridge is 10 and the wind number of said base wind to said outer wind is a ratio of about 19 to 11.

5. The method of claim 2 wherein the micron rating of the cartridge is 3 and the wind number of said base wind to said outer wind is a ratio of about 25 to 12-21.

6. The method of claim 2 wherein the micron rating of the cartridge is 2 and the wind number of said base wind to said outer wind is a ratio of about 39 to 13.

7. The method of claim 1 wherein the wind number for the base wind is in the range of 17 to 31 and the wind number for the outer wind is in the range of 7 to 13.

8. The method of claim 7 wherein the winder is switched in a transition zone of $\frac{1}{4}$ to $\frac{1}{2}$ inches in length at the end of said filter cartridge.

* * * * *